(12) United States Patent
Liu et al.

(10) Patent No.: US 7,319,504 B2
(45) Date of Patent: Jan. 15, 2008

(54) METHOD OF REPAIRING A LIQUID CRYSTAL DISPLAY PANEL

(75) Inventors: Hsiang-Lung Liu, Taoyuan County (TW); Kei-Hsiung Yang, Tao-Yuan Hsien (TW); Hsu-Ho Wu, Tai-Nan (TW)

(73) Assignee: HannStar Display Corp., Yangmei, Taoyuan (TW)

( * ) Notice: Subject to any disclaimer, the term of this patent is extended or adjusted under 35 U.S.C. 154(b) by 597 days.

(21) Appl. No.: 10/905,961

(22) Filed: Jan. 27, 2005

(65) Prior Publication Data

US 2006/0164590 A1    Jul. 27, 2006

(51) Int. Cl.
*G02F 1/1339* (2006.01)
*G02F 1/1341* (2006.01)

(52) U.S. Cl. .................. 349/187; 349/189; 349/190; 349/192; 349/154

(58) Field of Classification Search ............... 349/153, 349/154, 187, 188, 189, 190, 192
See application file for complete search history.

(56) References Cited

U.S. PATENT DOCUMENTS

| | | | |
|---|---|---|---|
| 7,256,862 B2 | 8/2007 | Chen et al. | |
| 2002/0196393 A1 | 12/2002 | Tashiro | |
| 2003/0160907 A1* | 8/2003 | Kweon et al. | 349/40 |
| 2004/0095526 A1* | 5/2004 | Yamabuchi et al. | 349/96 |

* cited by examiner

*Primary Examiner*—Dung T. Nguyen
*Assistant Examiner*—Tai Duong
(74) *Attorney, Agent, or Firm*—Winston Hsu (57) ABSTRACT

A method of repairing an LCD panel having a mura defect is disclosed. The closed seal pattern of the LCD panel has a shape of frame with at least one jut portion directing to a peripheral side of the two substrates. Thus, when a mura defect occurs, a peripheral portion on one side of the two substrates is cut off, wherein the cutting passes across the jut portion of the closed seal pattern to form an opening with respect to the sealed region. An extra amount of liquid crystal can be pressed out through the opening. Then the opening is sealed using a sealant, such that the LCD panel having a mura defect is repaired.

19 Claims, 12 Drawing Sheets

METHOD OF REPAIRING A LIQUID CRYSTAL DISPLAY PANEL

BACKGROUND OF INVENTION

1. Field of the Invention

The invention relates to a method of repairing a liquid crystal display panel (LCD panel), and more particularly, to a method of repairing an LCD panel obtained by one-drop-fill (ODF) method and having a mura defect.

2. Description of the Prior Art

Figure 1:
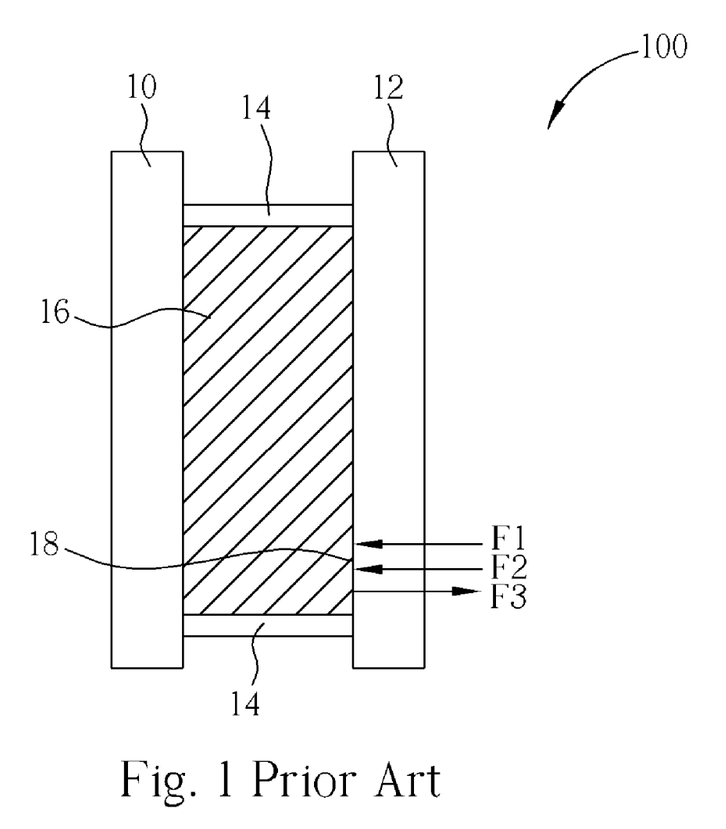
FIG. 1 is a schematic diagram showing the forces exerted to an erectly placed conventional LCD panel.

In recent years, display devices, such as LCD devices, have undergone great improvements in the areas of high performance, quality, larger size, and lower cost. Generally, the LCD panel is erectly placed, and gravity will change the internal pressure balance of the LCD panel. Please refer to FIG. 1 showing a schematic diagram of a conventional erectly placed LCD panel. The LCD panel 100 has two glass substrates 10 and 12, and the liquid crystal 16 is filled between the glass substrates 10 and 12 and is encapsulated by a sealing region 14. When the LCD panel 100 is erectly placed, three kinds of forces, which are shown as F1, F2, and F3 in FIG. 1, are exerted onto the bottom region 18 of the LCD panel 100. The arrows indicate the directions of F1, F2, and F3. The first force F1 is caused by a pressure difference between the liquid crystal 16 in the LCD panel 100 and the outside environment. The second force F2 is caused by the capillarity of the liquid crystal 16. The third force F3 is caused by the gravity of the liquid crystal.

When the sum of the forces F1 and F2 is larger than or equal to the force F3, the liquid crystal 16 in the LCD panel 100 is in a pressure balanced condition, and the images can be normally displayed. If the sum of the forces F1 and F2 is smaller than the force F3, a gravity mura will happen at the bottom region 18 of the erectly placed LCD panel 100, and seriously worsen the image quality.

Figure 2:
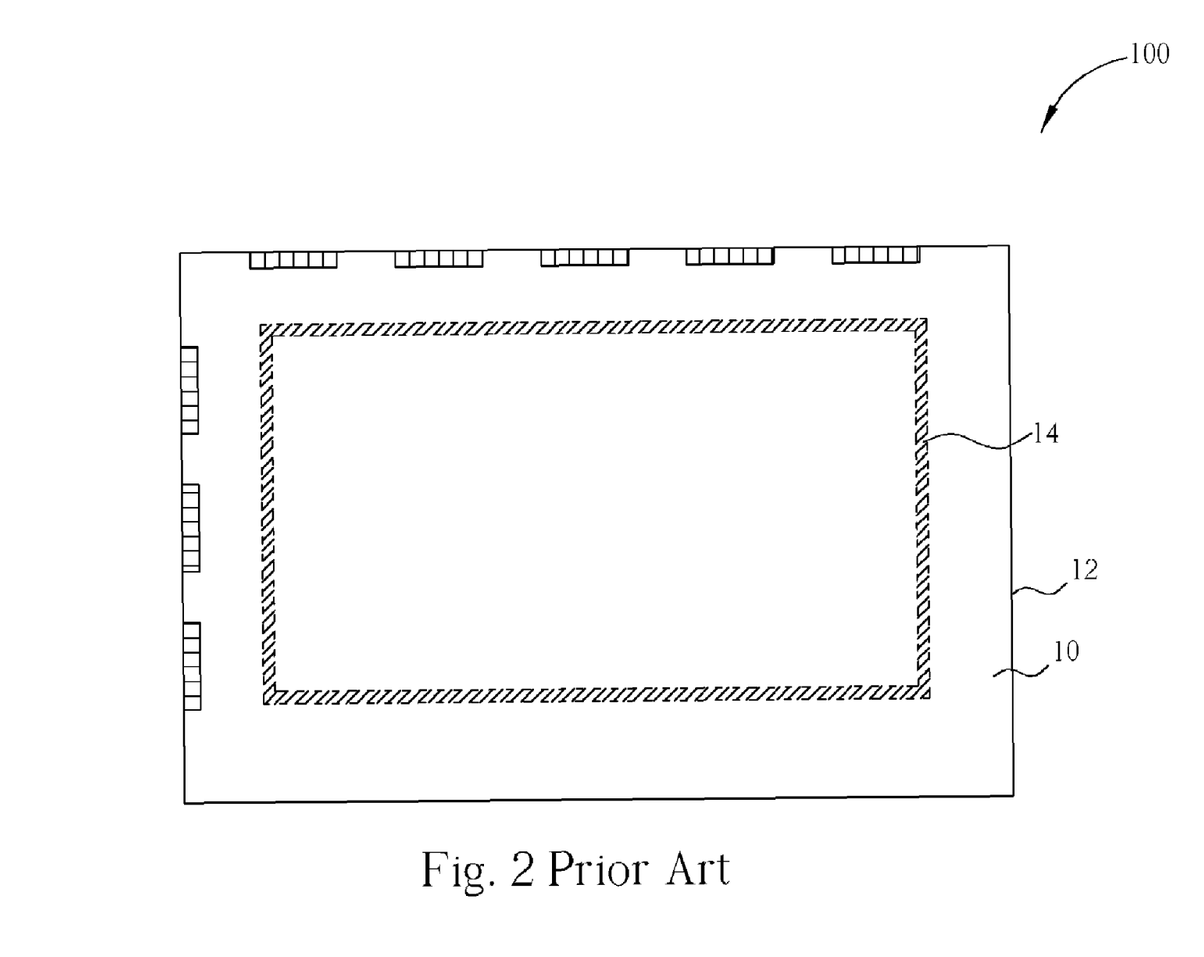
FIG. 2 is a schematic top view diagram showing the conventional LCD panel in FIG. 1.

FIG. 2 shows the schematic top view diagram of the conventional LCD panel shown in FIG. 1. The sealing region 14 is usually formed into a rectangular shape.

An ODF method has been developed for the large-size LCD panel manufacture to fast assembly cells and save cost of liquid crystal. However, the closed seal pattern of the ODF panel is a closed system. When the amount of the liquid crystal is not well controlled, a mura defect easily occurs due to excess amount. The resulting panel can not be repaired due to the close system, causing an huge economic loss.

Therefore, there is still a need for a method of repairing an LCD panel product having a mura defect.

SUMMARY OF INVENTION

It is therefore an objective of the present invention to provide a method of repairing an LCD panel obtained by an one-drop-fill (ODF) method and having a mura defect, so that the unqualified products can be easily repaired.

It is another objective of the present invention to provide a method of manufacturing an LCD panel utilizing an ODF method, such that the manufactured LCD panel can be prevented from having a mura defect.

According to the present invention, the method of repairing an LCD panel comprises the following steps. First, an LCD panel is provided. The LCD panel comprises two substrates positioned oppositely to each other, a closed seal pattern between the two substrates to form a sealed region, and a liquid crystal layer disposed in the sealed region between the two substrates. The closed seal pattern having a shape of frame with at least one jut portion directing to a periphery of the two substrates. Next, a peripheral portion of the two substrates is cut off, wherein the cutting passes across the jut portion of the closed seal pattern to form an opening with respect to the sealed region. Subsequently, a first pressure is continuously provided to two opposite surfaces of the LCD panel to press a portion of liquid crystal of the liquid crystal layer in the sealed region out through the opening. A sealant is applied to the opening. Then, the first pressure is changed to a second pressure less than the first pressure, such that the sealant enters the opening. Finally, the sealant is cured, and the LCD panel having a mura defect is repaired.

According to the present invention, the method of manufacturing an LCD panel comprises the following steps. First, a first substrate and a second substrate having a plurality of predetermined display regions are provided. Next, a sealing material is provided on a periphery region of each predetermined display region on one of the first and second substrate to form a shape of frame with at least one jut portion directing outward from the frame to the periphery of the predetermined display region. Liquid crystal is deposited on each predetermined display region on one of the first and second substrates. The first substrate and the second substrate are superposed such that the liquid crystal is hermetically sealed inside each seal pattern between the first substrate and the second substrate, resulting a plurality of display units. Subsequently, the display units are cut away from the first and second substrates such that at least one jut portion of the closed seal pattern of the display unit is cut across to form at least one opening with respect to the closed seal pattern, to result a separated display unit. Then, a first pressure is continuously provided to two opposite surfaces of the separated display unit to press a portion of the liquid crystal out through the at least one opening. A sealant is provided to the at least one opening. A second pressure less than the first pressure is provided, such that the sealant enters the at least one opening. Finally, the sealant is cured to form a liquid crystal display panel.

According to one embodiment of the present invention, the amount of liquid crystal used to fill in the sealed region is an amount of 3 to 10% more than the theoretically needed amount for the liquid crystal display panel to be made. Therefore, all the display units formed after substrate assembling will have mura effect and need to be repaired by cutting to form at least one opening at the jut portion to expel extra liquid crystal.

According to another embodiment of the present invention, steps as follows are further comprised. Each display unit is checked to find a mura defect for the determination of cutting line position. For the display unit having not a mura defect, the display unit is cut away from the first and second substrates to form a liquid crystal display panel. For the display unit having a mura defect, the display unit having a mura defect is cut away from the first and second substrates such that at least one jut portion of the seal pattern of the display unit having a mura defect is cut across to form at least one opening with respect to the seal pattern, to result a separated display unit. Subsequently, a portion of liquid crystal is expelled to form liquid crystal display panels.

It is an advantage of the present invention that the manufactured LCD panel having a mura defect can be repaired by cutting across a jut portion of the closed seal pattern to form openings used to press extra liquid crystal and then sealed to form an LCD panel without the defect. The amount of the liquid crystal in the liquid crystal display panel is reduced, so that the gravity mura can be effectively repaired. As a result, an LCD panel having a mura defect can be conveniently repaired and the yield of the manufacture is improved according to the present invention.

These and other objectives of the present invention will no doubt become obvious to those of ordinary skill in the art after reading the following detailed description of the preferred embodiment that is illustrated in the various figures and drawings.

DETAILED DESCRIPTION

Please refer to FIGS. 3 to 7, which are schematic diagrams showing a repairing method according to the present invention.

Figure 3:
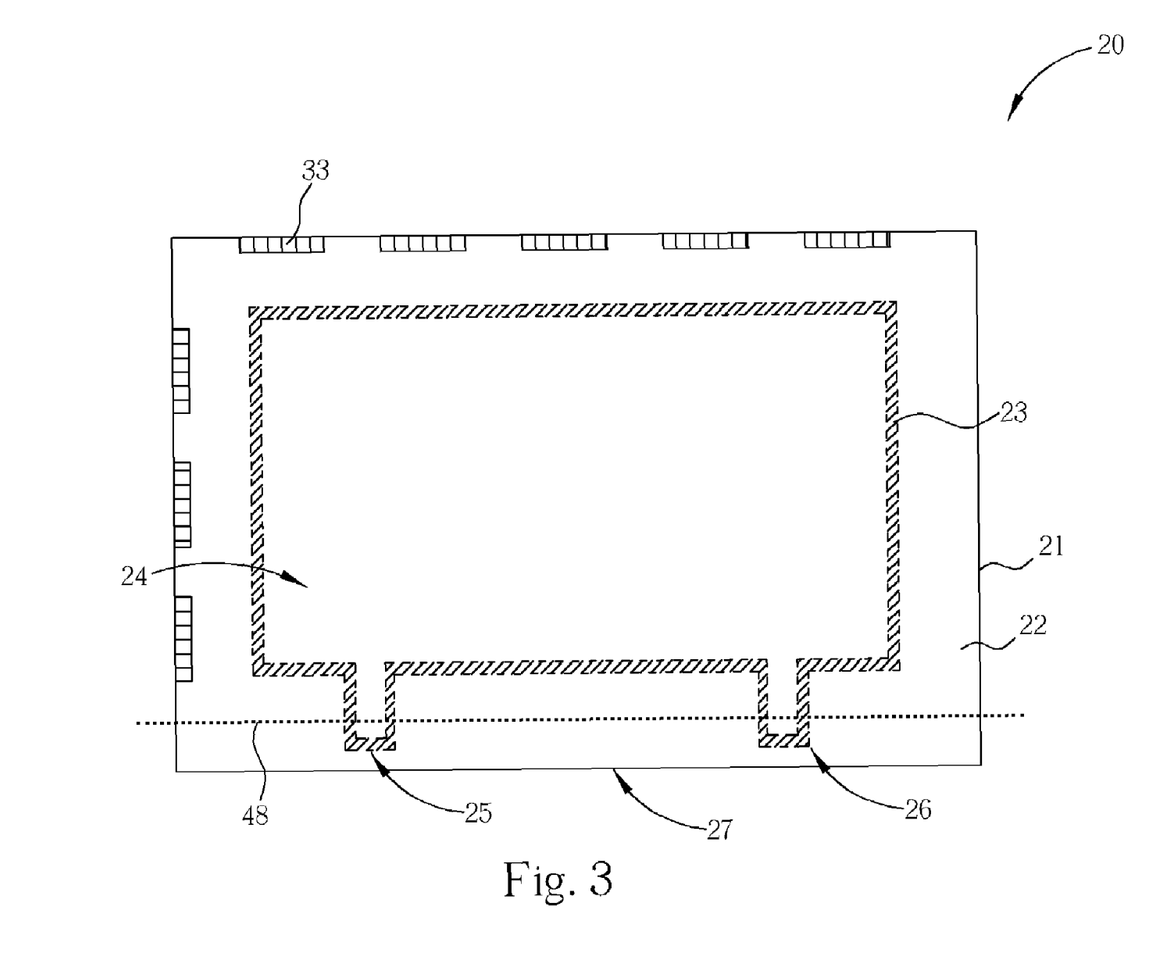
FIGS. 3 to 7 are schematic diagrams showing a repairing method according to the present invention.
Figure 4:
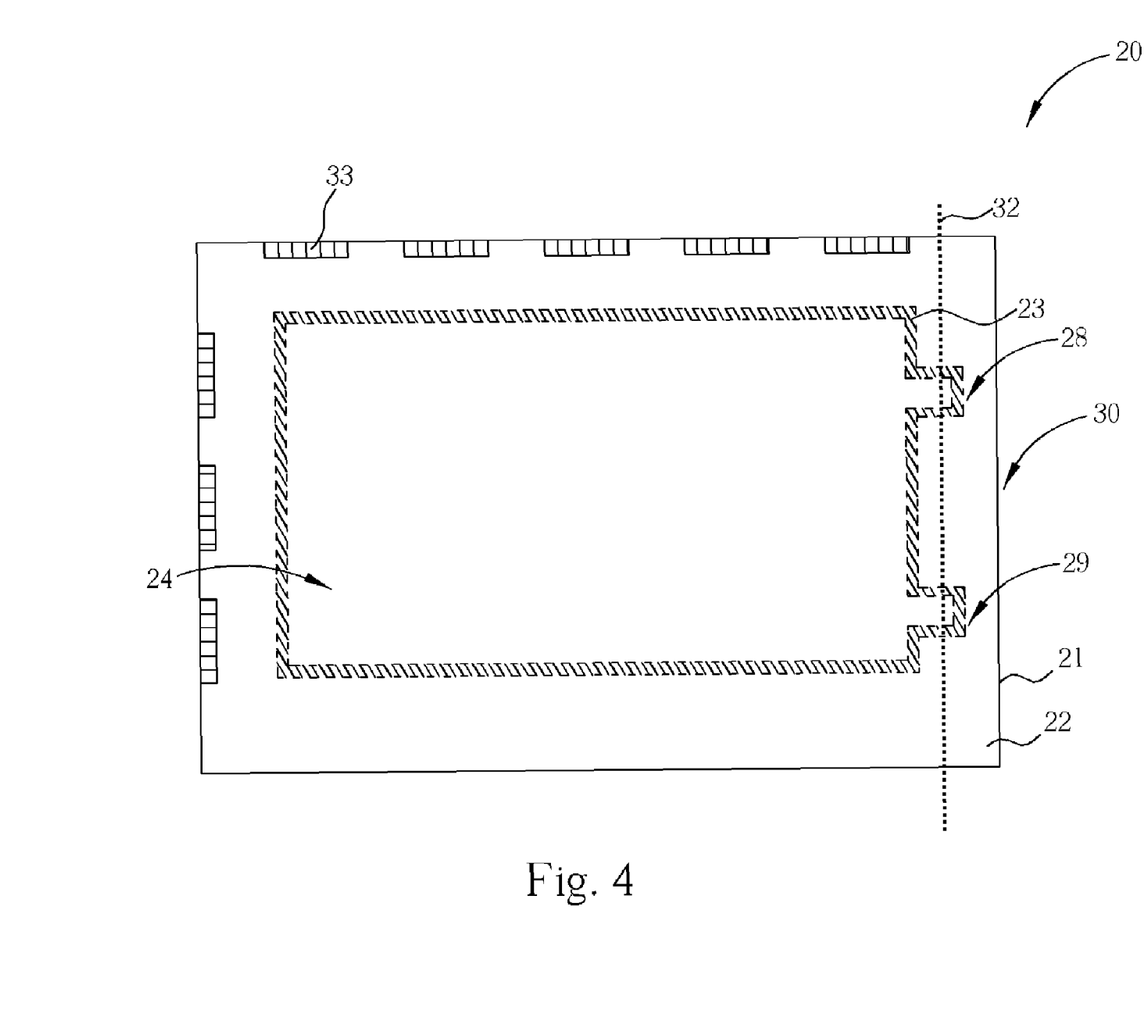

First, as shown in FIG. 3, an LCD panel is provided. The LCD panel is manufactured by an ODF method and has a mura defect. The LCD panel comprises two substrates 21 and 22 positioned oppositely to each other. A closed seal pattern 23 is positioned between the two substrates 21 and 22 to form a sealed region 24 to be filled with liquid crystal. The closed seal pattern 23 may comprise one loop of sealing material and have a shape of frame with at least one jut portion 25. The shape of frame is not particularly limited, but generally a rectangular shape, as one frequently used in a conventional LCD panel. As shown in FIG. 3, there are two jut portions 25 and 26 directing to a periphery 27 of the two substrates 21 and 22. The periphery 27 is not the periphery for arrangement of data lines or signal lines and connection pads 33 for them, and thus it can be either one of the remaining two peripheries if the frame is in a rectangular shape. As shown in FIG. 4, which is a schematic diagram showing an alternative for the position of the jut portion according to the present invention, the two jut portions 28 and 29 direct to another periphery 30 of the two substrates 21 and 22. That is, if the closed seal pattern is in a rectangular shape, the jut portion always positions at the side of the rectangular shape not provided with connection pads. The number of jut portion is not particularly limited, and may be one or more. A liquid crystal layer (not shown) is disposed in the sealed region 24 between the two substrates 21 and 22 and inside the closed seal pattern 23. There may be a plurality of spacers (not shown) further disposed in the sealed region 24.

The LCD panel is found to have a mura defect. The mura defect can be easily detected by, for example, a naked eye at one side of the LCD panel to inspect the LCD panel lit by a light from the other side of the LCD display, or by other conventional technology.

Figure 5:
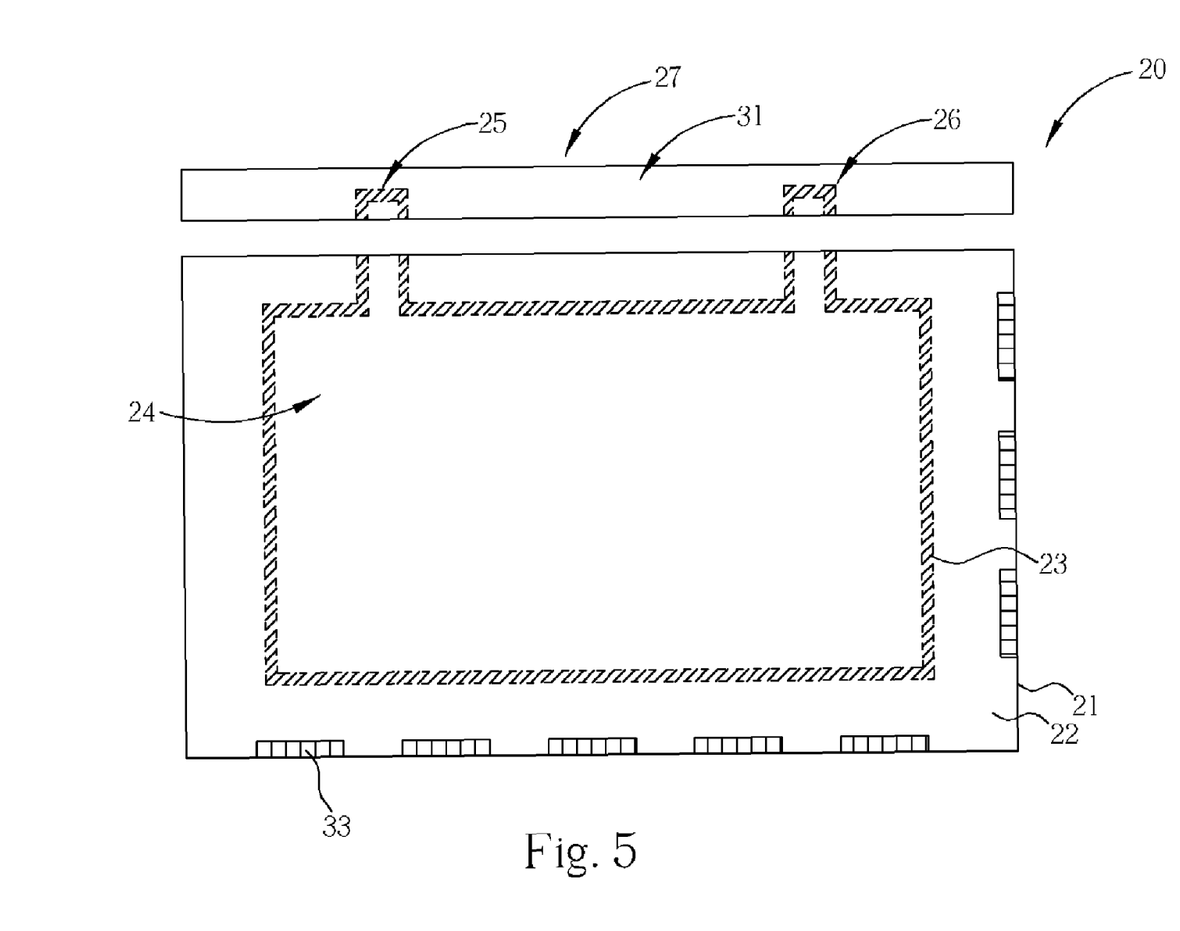

Next, as shown in FIG. 5, in the case that the LCD panel has a mura defect, a portion 31 of the LCD panel is cut away from the two substrates 21 and 22 along a cutting line 48 (or 32 as shown in FIG. 4). The cutting line 48 is set to pass through one side of the two substrates and further across the closed seal pattern 23 but only at the jut portions 25 and 26, such that merely two small openings are formed at the jut portions 25 and 26 to expose the liquid crystal (not shown) in the sealed region 24. The distance between the cutting line 48 and the normal cutting line is not particularly limited, as long as the normal cutting line does not touch the sealing pattern including the jut portion and the cutting line 48 is across the jut portion. When the distance difference is small, the size difference of the repaired LCD panel and the normal LCD panel is small, and such situation is preferred. The size and the shape of the jut portion or the opening are not particularly limited as long as the liquid crystal in the sealed region can be pressed out through the opening formed by cutting across the jut portion. The jut portion may be, for example, rectangular, triangular, arc shape, or in irregular shape.

Figure 6:
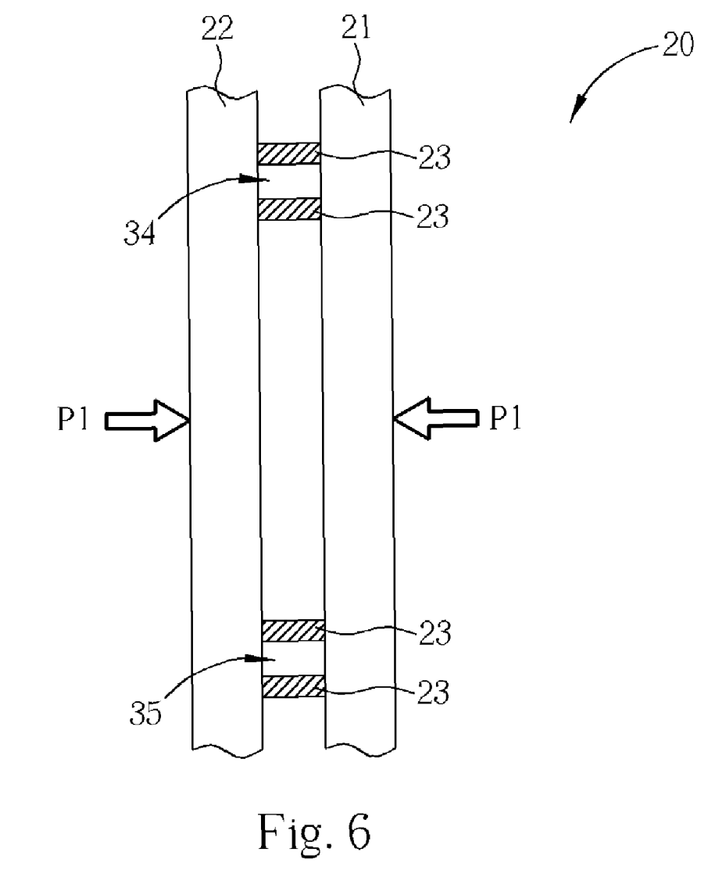

Then, as shown in FIG. 6, which is a sectional view taken along line 48 of FIG. 3 after the portion of the substrates is cut off, a first pressure P1 is continuously provided to two opposite surfaces of the liquid crystal display panel 20 to press a portion of liquid crystal of the liquid crystal layer in the sealed region 24 out through the openings 34 and 35. The first pressure P1 may be exemplarily in the range of $3.0 \times 10^4$ to $6.5 \times 10^4$ Pa, and can be further provided at a temperature between 20° C. and 80° C. to keep the liquid crystal in large-capacity status. The suitable pressure and temperature are used for pressing liquid crystal out of the sealed region and can be easily attained by those skilled in the art. The liquid crystal pressed out from the opening and left on the outer surfaces of the two substrates may be cleaned up by, for example, wiping. The amount of liquid crystal pressed out may be, for example, in the range of 0.5% to 5% of the original amount.

Figure 7:
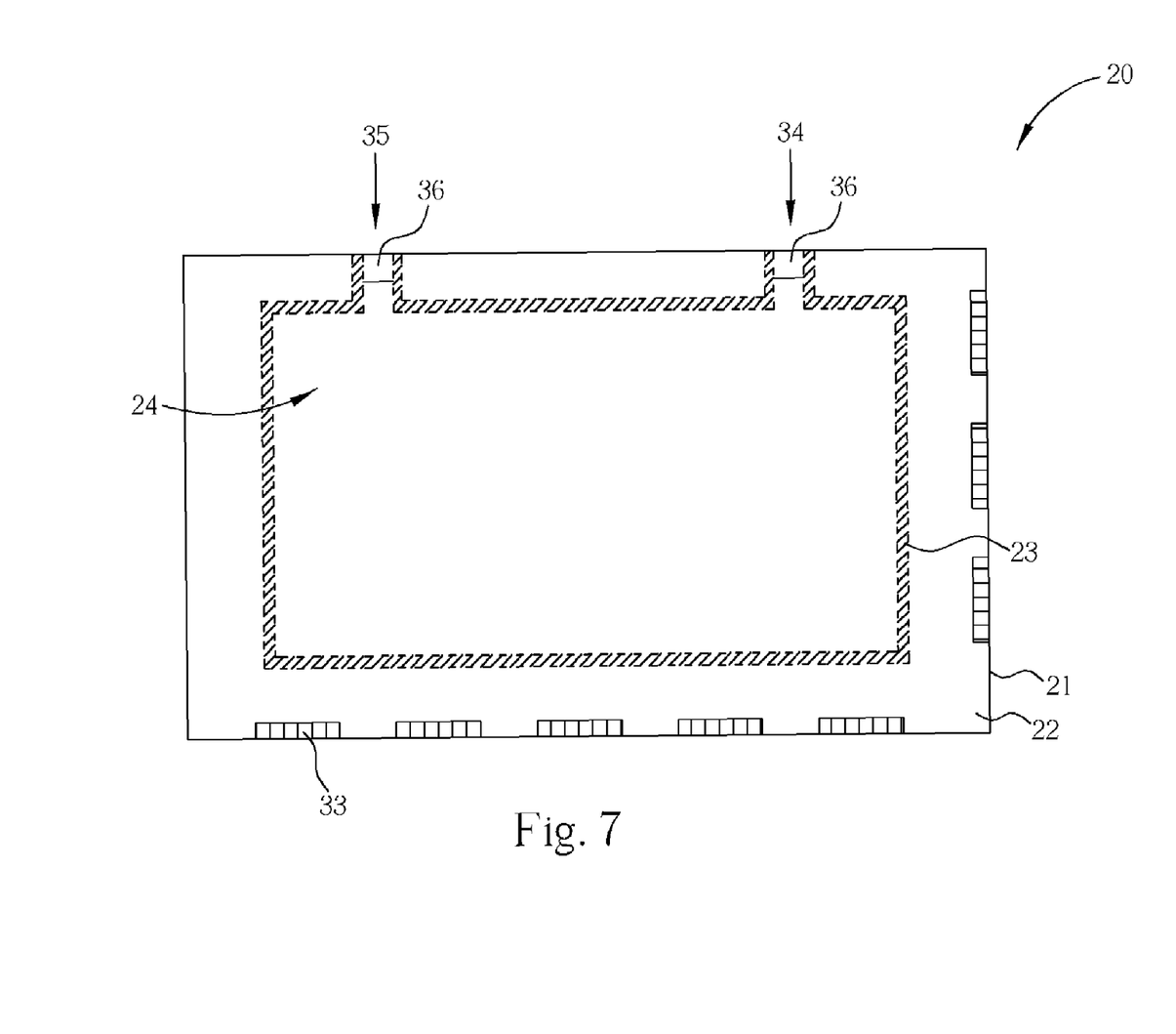

Subsequently, as shown in FIG. 7, a sealant 36 is applied into the openings 34 and 35. Then, the first pressure P1 is changed to a second pressure P2 less than the first pressure P1, such that the sealant 36 enters the openings 34 and 35. The second pressure P2 may be exemplarily in the range of $2.0 \times 10^4$ to $5.0 \times 10^4$ Pa, and can be further provided at a temperature between 20° C. and 80° C. to keep the liquid crystal in large-capacity status.

Finally, a curing process is performed to harden the sealant 36. For example, when the sealant 36 comprises an ultraviolet sensitive material, an ultraviolet light is utilized to harden the sealant. Thus, the LCD panel 20 is repaired to eliminate the mura defect.

The repairing method according to the present invention still use a close system like the close system used in the ODF method, while the closed seal pattern in the present invention is designed to have at least one jut portion which can be cut across together with a portion of substrates for use as an opening to discharge the extra liquid crystal when the mura defect occurs. Thus, the manufacture of LCD panels can be still performed by an ODF method while the yield can be improved due to the repairing using the method of the present invention.

Please refer to FIGS. 8 to 12, which are schematic diagrams showing the method of manufacturing a liquid crystal display panel according to the present invention.

Figure 8:
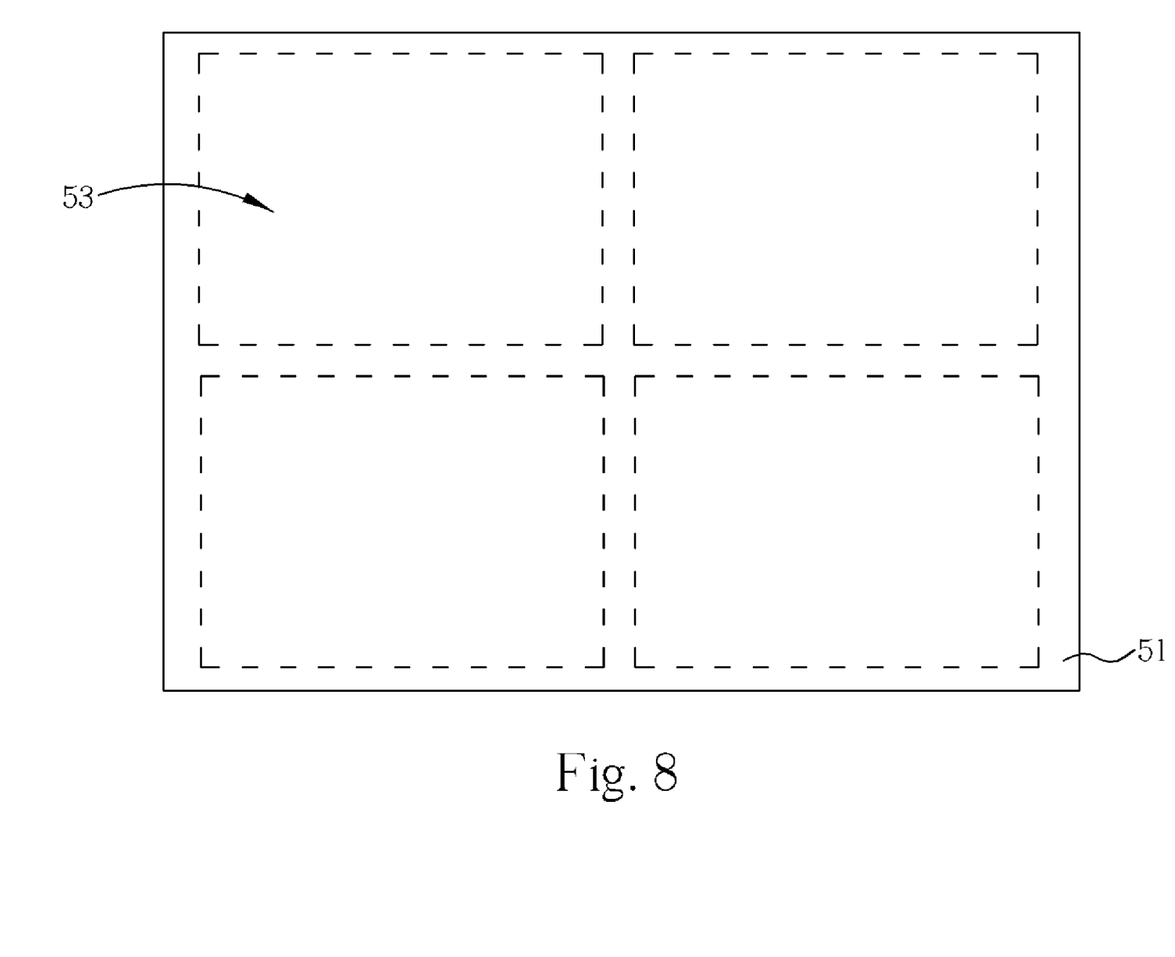
FIGS. 8 to 12 are schematic diagrams showing a manufacturing method of an LCD panel according to the present invention.

First, a first substrate and a second substrate having a plurality of predetermined display regions for display are provided. FIG. 8 schematically shows the first substrate 51 and the predetermined display regions 53.

Figure 9:
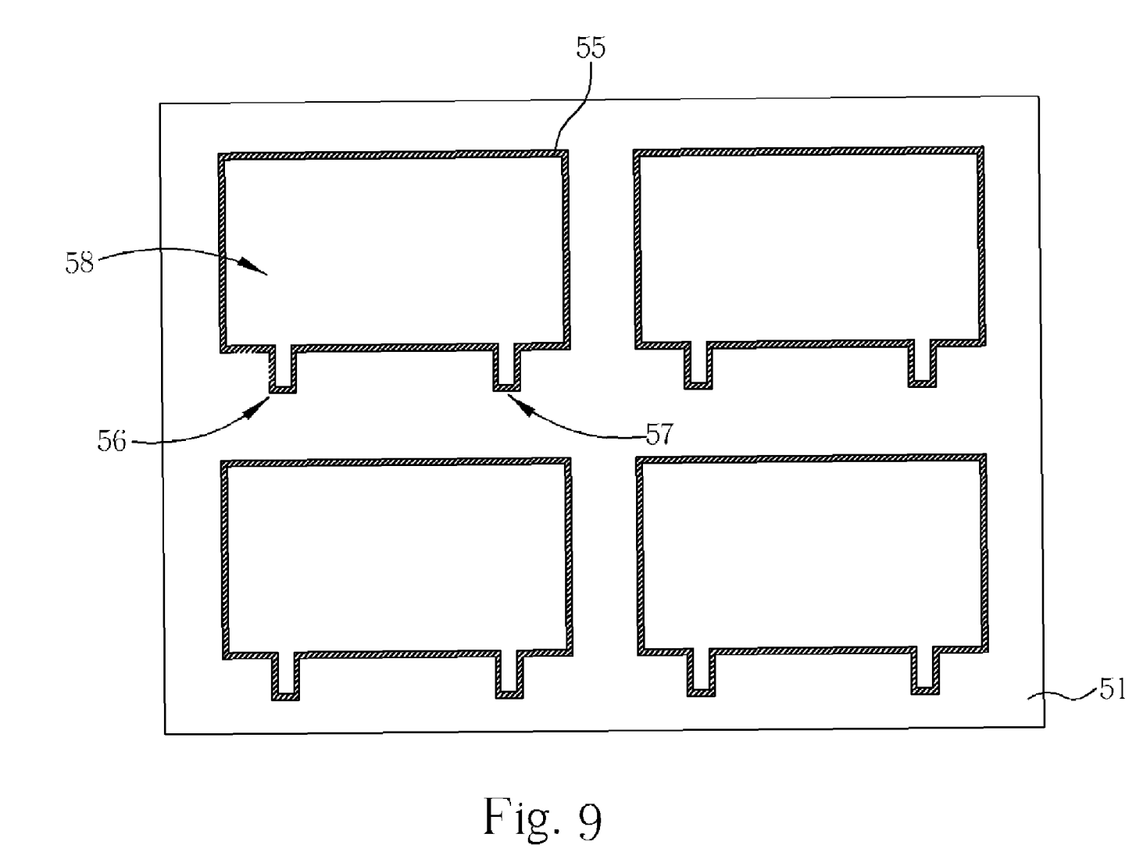

As shown in FIG. 9, a sealing material 55 is applied on a periphery region of the predetermined display region 53 on the first substrate 51 to form a shape of frame with two jut portions 56 and 57 directing outward from the frame to the periphery of the predetermined display region 53. The number, shape, size, and position of the jut portions are the same as described above. Liquid crystal 58 is disposed on the predetermined display regions 53 respectively on the first substrate 51. It may be disposed on the predetermined display regions of the second substrate.

Figure 10:
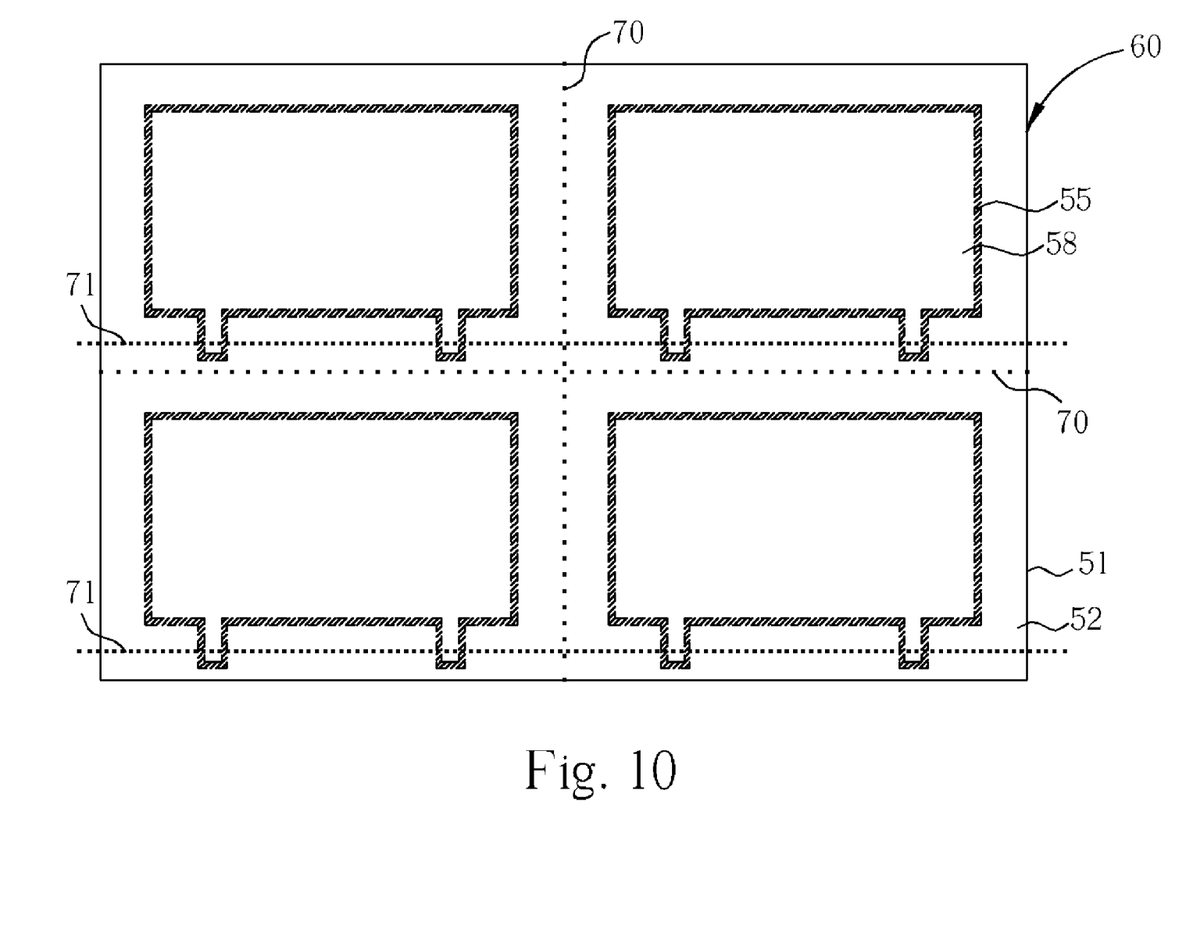

As shown in FIG. 10, the second substrate 52 is superposed upon the first substrate 51 such that the sealing material 55 and the liquid crystal 58 are between the first and second substrates 51 and 52. The sealing material 55 is cured to form a closed seal pattern such that the liquid crystal 58 is hermetically sealed inside the closed seal pattern between the first substrate 51 and the second substrate 52, giving a display unit 60.

Figure 11:
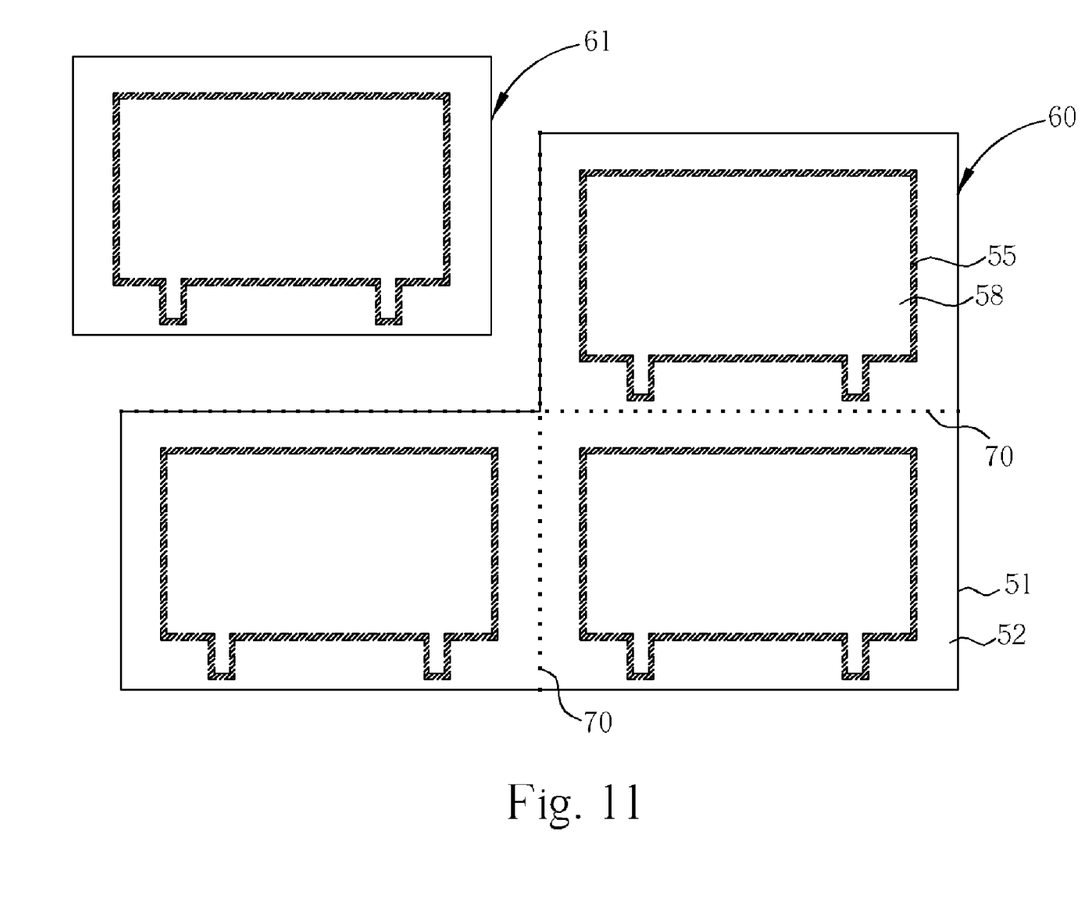

The display units 60 not separated yet can be checked to find a mura defect. If the display unit has not a mura defect, the display unit is cut along normal cutting lines 70 to be away from the first and second substrates 51 and 52 to form a liquid crystal display panel 61, as shown in FIG. 11.

Figure 12:
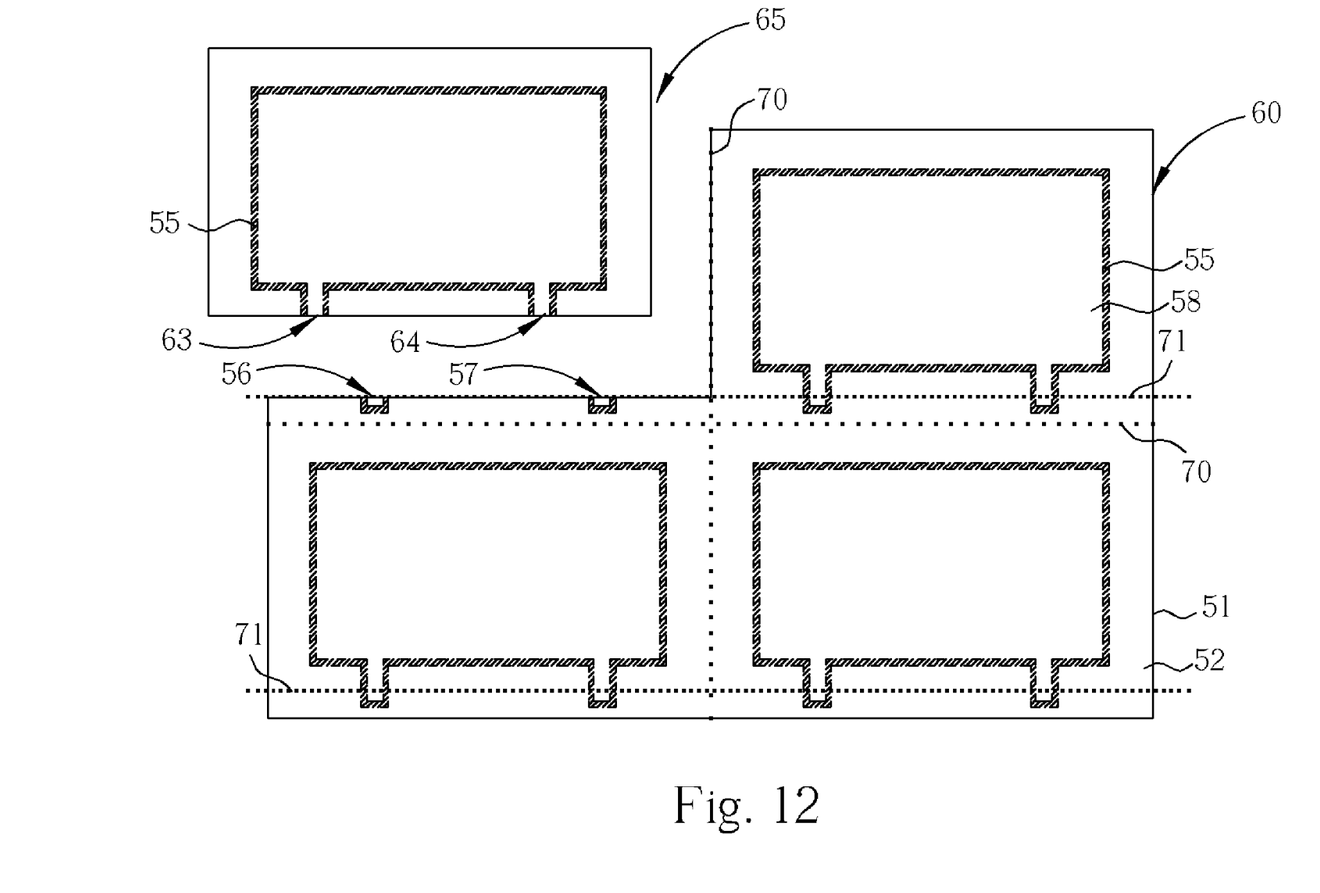

If the display unit 60 is checked to have a mura defect, the display unit 60 having a mura defect is cut away from the first and second substrates 51 and 52, for example, along a cutting line 71 as shown in FIG. 12, such that the jut portions 56 and 57 of the closed seal pattern 55 of the display unit 60 having a mura defect is cut across to form two openings 63 and 64 with respect to the closed seal pattern 55, giving a separated display unit 65.

Briefly, the position for cutting to separate the display unit in the method according to the present invention depends on whether the display unit has a mura defect. If the display unit is checked to have not a mura defect, it is cut away from the substrates as a normal product. The cutting won't touch any closed seal pattern. If the display unit is checked to have a mura defect, it is cut away from the substrates with a cutting passing across at least one jut portion. Therefore, at least one opening with respect to the closed seal pattern is formed to expose the liquid crystal inside the closed seal pattern, and thus the repairing for the mura defect as describe above and as shown in FIGS. 5 to 7 can be further performed to produce a qualified LCD panel.

As it is noted that the LCD panel after the repairing according to the present invention has a size slightly smaller than that of the normal one. As the size difference is slight, the resulting LCD panel after repaired is still well accommodated in the LCD housing box.

In the embodiment described above, the amount of liquid crystal deposited on the predetermined region may be a predetermined amount which is theoretically needed for the liquid crystal display panel to be made.

According to another embodiment of the present invention, in the LCD manufacturing process, the amount of liquid crystal used to fill in the sealed region 24 is not an amount of liquid crystal typically needed for the liquid crystal display panel, but an amount of 3 to 10% more than the needed amount for the liquid crystal display panel instead. After the LCD panel is assembled, the cutting process is performed along a cutting line passing across at least one jut portion directly, to obtain display units each having an opening at the jut portion, such that the step of checking the panel for the mura defect is not performed in this embodiment. The extra liquid crystal is pressed out from the panel unit through the jut opening, and the display unit may be subjected to a conventional end-sealing process to seal the openings. The advantages of such manufacturing process are that all the panel units obtained have a substantially same size and the checking step is not required.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of repairing a liquid crystal display panel, comprising:
   providing a liquid crystal display panel having:
      two substrates positioned oppositely to each other,
      a closed seal pattern between the two substrates to form a sealed region, the closed seal pattern having a shape of frame with at least one jut portion directing to a periphery of the two substrates, and
      a liquid crystal layer disposed in the sealed region between the two substrates;
   cutting off a peripheral portion of the two substrates, wherein the cutting passing across the jut portion of the closed seal pattern such that the sealed region has at least one opening;
   continuously providing a first pressure to two opposite surfaces of the liquid crystal display panel to press a portion of liquid crystal of the liquid crystal layer in the sealed region out through the opening;
   applying a sealant to the opening;
   changing the first pressure to a second pressure less than the first pressure, such that the sealant enters the opening; and
   curing the sealant.

2. The method of claim 1, wherein the liquid crystal display panel is a one drop fill (ODF) liquid crystal display panel.

3. The method of claim 1, wherein the closed seal pattern has a rectangular shape of frame and the jut portion positions at the side of the rectangular shape not provided with connection pads.

4. The method of claim 1, further comprising the step of cleaning up the liquid crystal pressed out from the opening and left on the outer surfaces of the two substrates after the step of continuously providing the first pressure to two opposite surfaces of the liquid crystal display panel to press a portion of liquid crystal of the liquid crystal layer in the sealed region out from the opening.

5. The method of claim 1, wherein the opening formed by cutting the jut portion has a size enough for the liquid crystal to be pressed out.

6. The method of claim 1, wherein the jut portion has a rectangular, triangular, or arc shape.

7. The method of claim 1, wherein the liquid crystal display panel comprises a plurality of spacers in the sealed region.

8. The method of claim 1, wherein continuously providing the first pressure is performed at a temperature between 20 and 80° C.

9. The method of claim 1, wherein continuously providing the second pressure is performed at a temperature between 20 and 80° C.

10. A method of manufacturing a liquid crystal display panel, comprising:
    providing a first substrate and a second substrate having a plurality of predetermined display regions;
    applying a sealing material on a periphery region of each predetermined display region on one of the first and second substrate to form a shape of frame as a seal pattern with at least one jut portion directing outward from the frame to the periphery of the predetermined display region;
    depositing liquid crystal on each predetermined display region on one of the first and second substrates;

superposing the first substrate and the second substrate such that the liquid crystal is hermetically sealed inside each seal pattern between the first substrate and the second substrate, resulting a plurality of display units;

cutting the display units away from the first and second substrates such that at least one jut portion of the seal pattern of the display unit is cut across to form at least one opening with respect to the seal pattern, to result a separated display unit;

continuously providing a first pressure to two opposite surfaces of the separated display unit to press a portion of the liquid crystal out through the at least one opening;

applying a sealant to the at least one opening;

providing a second pressure less than the first pressure, such that the sealant enters the at least one opening; and curing the sealant, forming a liquid crystal display panel.

11. The method of claim 10, wherein the seal pattern has a rectangular shape of frame and the jut portion positions at the side of the rectangular shape not provided with connection pads.

12. The method of claim 10, further comprising the step of cleaning up the liquid crystal pressed out from the opening and left on the outer surfaces of the first and second substrates after the step of continuously providing the first pressure to two opposite surfaces of the separated display unit to press a portion of the liquid crystal out from the opening.

13. The method of claim 10, wherein the opening formed by cutting the jut portion has a size enough for the liquid crystal to be pressed out.

14. The method of claim 10, wherein the jut portion has a rectangular, triangular, or arc shape.

15. The method of claim 10, further comprising a step of forming a plurality of spacers in each predefined display region on the first or second substrate before the step of depositing liquid crystal on each predetermined display region on one of the first and second substrates.

16. The method of claim 10, wherein continuously providing the first pressure is performed at a temperature between 20 and 80° C.

17. The method of claim 10, wherein continuously providing the second pressure is performed at a temperature between 20 and 80° C.

18. The method of claim 10, wherein, in the step of depositing liquid crystal on each predetermined display region on one of the first and second substrates, the liquid crystal deposited has an amount of 3 to 10% more than a theoretically needed amount of liquid crystal for the liquid crystal display panel.

19. A method of manufacturing a liquid crystal display panel, comprising:

providing a first substrate and a second substrate having a plurality of predetermined display regions;

applying a sealing material on a periphery region of each predetermined display region on one of the first and second substrate to form a shape of frame with at least one jut portion directing outward from the frame to the periphery of the predetermined display region;

depositing liquid crystal on each predetermined display region on one of the first and second substrates;

superposing the first substrate and the second substrate such that the liquid crystal is hermetically sealed inside each seal pattern between the first substrate and the second substrate, resulting a plurality of display units;

checking each display unit to find a mura defect; and for the display unit having not a mura defect, cutting the display units away from the first and second substrates, forming a liquid crystal display panel;

and for the display unit having a mura defect, cutting the display unit having a mura defect away from the first and second substrates such that at least one jut portion of the seal pattern of the display unit having a mura defect is cut across to form at least one opening with respect to the seal pattern, to result a separated display unit;

continuously providing a first pressure to two opposite surfaces of the separated display unit to press a portion of the liquid crystal out through the at least one opening;

applying a sealant to the at least one opening;

providing a second pressure less than the first pressure, such that the sealant enters the at least one opening; and curing the sealant, forming a liquid crystal display panel.

* * * * *